Sept. 9, 1969    R. A. HAMILTON    3,465,450
BODY JOINT MEASURING DEVICE

Filed Jan. 13, 1966    2 Sheets-Sheet 1

INVENTOR.
R. A. Hamilton
BY John P. Murphy

Sept. 9, 1969   R. A. HAMILTON   3,465,450
BODY JOINT MEASURING DEVICE
Filed Jan. 13, 1966   2 Sheets-Sheet 2

INVENTOR.
R. A. Hamilton
BY John P. Murphy

United States Patent Office 3,465,450
Patented Sept. 9, 1969

3,465,450
BODY JOINT MEASURING DEVICE
Richard Alexander Hamilton, 5 Easterly Ave.,
Auburn, N.Y. 13021
Filed Jan. 13, 1966, Ser. No. 520,454
Int. Cl. A61b 5/10
U.S. Cl. 33—174                                        2 Claims

ABSTRACT OF THE DISCLOSURE

An apparatus and process for measuring the degree of articulation in human body members, employing the use of a body joint measuring device.

---

The present invention relates to an apparatus and process for measuring the degree of articulation in human body members, employing the use of a body joint measuring device.

As a result of certain pathologic and functional conditions, the normal flexibility of various joints of the human body may be impaired to a greater or lesser degree. Such impaired flexibility may be treated by several well-known methods. The joint may respond very slowly to such treatments, and it is therefore important that the condition be accurately analyzed and measured during treatment so that it can be ascertained whether or not the condition is improviding. Proving the existence of a disability due to a subluxation and subsequent correction also indicates a need for an accurate measuring apparatus and process. When malingering is suspected, an accurate method and apparatus is needed to uncover feigned illness.

Devices to measure the degree of articulation in a joint in a human are known in the art, but many devices require moving parts which are subject to wear, many devices require an operator who must be especially trained to use the device accurately, and these devices are relatively expensive to manufacture. Devices already known in the art are not useful for measuring the degree of articulation in knees, elbows and hips, as well as measuring cervical rotation, lateral tipping of the head, and anterior and posterior cervical flexion of the neck.

It is, therefore, a principal object of the present invention to provide a method and apparatus for accurately and quantitatively measuring the amount of flexing or bending of which a particular joint is capable at a particular time, so that it can be ascertained if such flexing is normal or not, and if not, ascertain the degree of impairment.

Another object is to provide an apparatus and method that is simple to use.

Another object is to provide an apparatus that is simple and inexpensive to manufacture, and yet still maintain its accuracy.

Other objects and advantages will be shown with reference to the following drawings and description.

The apparatus comprises, in the preferred embodiment, a large, flat, body joint measuring device. The body joint measuring device is a flat plate 1 of heavy gauge transparent plastic, glass or other suitable material, with a yoke 2 cut out of one side.

Figure 1:
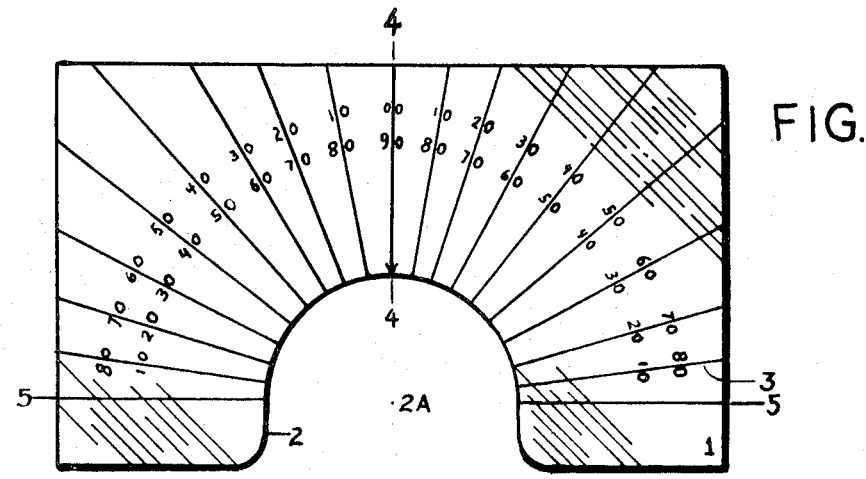
FIG. 1 is a plan view of a body joint measuring device.

Referring to FIG. 1, the body joint measuring device is marked with a scale 3 on plate 1, having the vertical zero or 90° mark known hereinafter as the pointer 4, at the highest point on the yoke 2, and the horizontal zero or 90° mark known hereinafter as the base line 5, at right angles to the pointer 4. The calibrated scale 3 preferably constitutes approximately one-quarter a complete circle of 360 degrees to the left of said pointer 4, and approximately one-quarter a complete circle of 360 degrees to the right of said pointer 4, with radial lines drawn from center point 2a to the outside edge of plate 1, indicating, in this embodiment, ten degree divisions in succession. Numerals are not required, but may be placed on plate 1 to indicate the distance of the ten degree divisions from the pointer 4 or the base line 5, to facilitate reading the scale 3.

Figure 2:
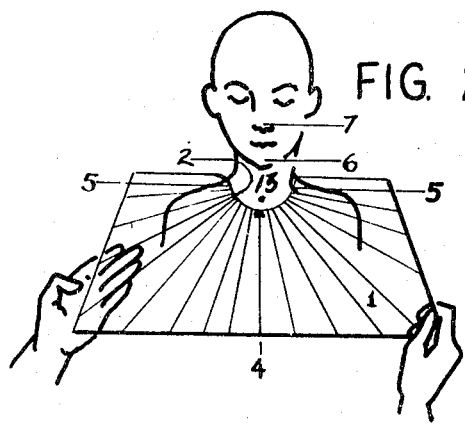
FIG. 2 shows the body joint measuring device in use to measure the anterior-posterior head nod limits.

To measure the degree of limitation in turning the head left or right, the following procedure is utilized. The patient is seated on a low stool, and the edge of the described body joint measuring device is held horizontally on the patient's shoulders with his neck inside the yoke 2, as shown in FIG. 2. The base line 5 is aligned immediately beneath the patient's ears, and the pointer 4 is pointed at the episternal notch 13. The patient is then instructed to turn his head from left to right. Using the center mark 6 on the patient chin as a reference point, the measurement is taken by noting the range of movement on the calibrated scale 3 of the plate 1.

Figure 3:
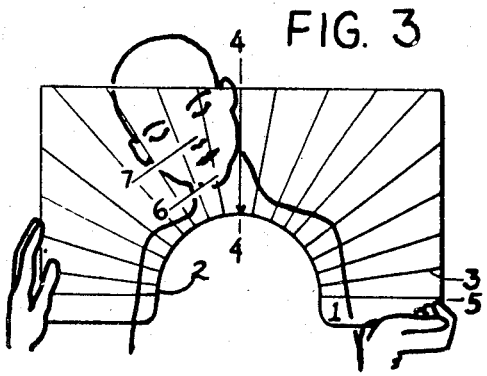
FIG. 3 shows the body joint measuring device in use to measure the cervical rotation limits.

To measure the degree of limitation in lateral tipping of the head (left and right side-to-side movement), the patient is seated on a low stool and the body joint measuring device is held vertically in front of the patient's face, as shown in FIG. 3. The base line 5 is aligned with the patient's shoulder line level, and the patient is instructed to tip his head to both right and left limits. The body joint measuring device is then moved from side to side until the nose reference point 7 and chin reference point 6 are approximated by a degree line, and the measurement is taken by noting the range of movement on the calibrated scale 3 of the plate 1.

Figures 4, 5:
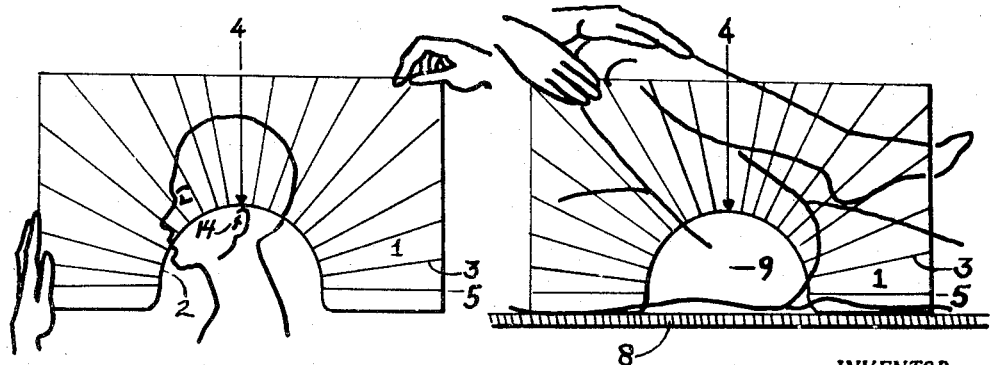
FIG. 4 shows the body joint measuring device in use to measure the lateral head tip movement limits.
FIG. 5 shows the body joint measuring device in use to measure the hip flexion and extension limits.

To take the anterior and posterior cervical flexion (backward and forward nod of the head), the patient is seated on a low stool, and the body joint measuring device is held vertically at the side of the patient's face as shown in FIG. 4. Base line 5 is aligned parallel to the floor, and the pointer 4 is pointed down at the center of the ear 14. The patient is then instructed to flex his neck forward and backward to both limits, and the total range of movement is noted from the calibrated scale 3 on plate 1.

To take the measurement of hip flexion and extension, the patient is lain supine on a table top 8, and the body joint measuring device is held against the fully flexed thigh as shown in FIG. 5. The base line 5 is aligned parallel to the table top 8, with the pointer 4 pointed down at the greater trochanter 9. The same procedure is then followed with the leg fully extended, and the range of movement measurement is then taken from the scale 3 on the plate 1.

Figure 6:
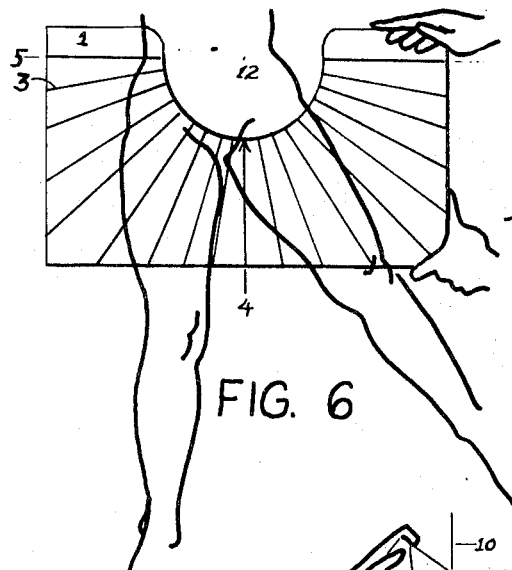
FIG. 6 shows the body joint measuring device in use to measure the hip abduction limits.

To take the measurement of hip adduction and abduction, the patient is lain supine on a table top (not shown), and the inverted body joint measuring device is held against the anterior pelvis as shown in FIG. 6. The base line 5 is aligned with both femur heads, and the pointer 4 is pointed up at the superior anterior iliac spine. The patient is then instructed to abduct his leg to the limit, and a measurement of the range is taken from the calibrated scale 3 on the plate 1.

Figure 7:
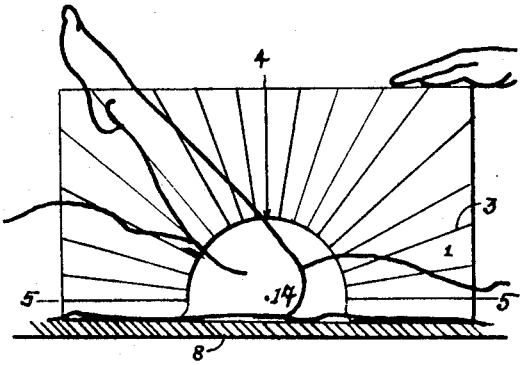
FIG. 7 shows the body joint measuring device in use to measure the knee flexion and extension limits.

To take the measurement of knee flexion and extension, the patient is lain prone on a table top 8, and the body joint measuring device is held against the fully flexed foreleg as shown in FIG. 7. The base line 5 is aligned with the femur, and the pointer 4 is pointed down at the center of the patient's knee 14. The same procedure is then followed with the leg fully extended, and the range of movement measurement is then taken from the scale 3 on the plate 1.

The elbow flexion and extension measurement is taken by seating the patient on a low stool, with the body joint measuring device held against the fully flexed forearm (not shown). The base line 5 is aligned with the humerus and the pointer 4 is pointed down at the center of the patient's elbow. The same procedure is then followed with the arm fully extended, and the range of movement is then taken from scale 3 on the plate 1.

Figure 8:
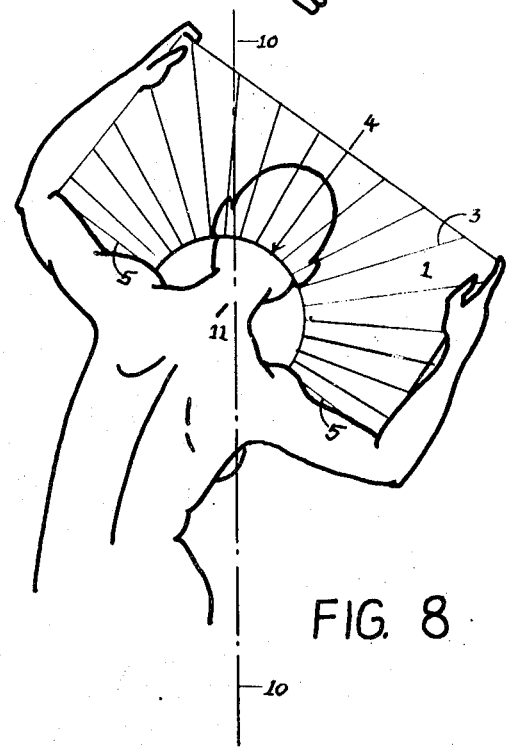
FIG. 8 shows the body joint measuring device in use to measure the total lateral movement of the entire spine.

To take the measurement of the full spine bend (total lateral movement of the entire spine), the patient is instructed to stand with both feet together. The patient is then instructed to hold the body joint measuring device firmly on his shoulders with the body joint measuring device centered behind the occiput 11, as shown in FIG. 8. The patient is then instructed to bend his entire spine to the left and right lateral limits. The most nearly plumb degree line determines the range of movement which is read from the calibrated scale 3 on the plate 1.

The body joint measuring device may have a spirit level of conventional design attached to the upper edge of the body joint measuring device to insure the accuracy of the base line when it is supposed to be in a level position.

While the preferred construction of the apparatus and the preferred method of using said apparatus has been described, various modifications are possible without departing from the spirit of this invention, and is not meant to limit the apparatus and method to the precise forms shown in the drawings and description.

With the foregoing objects having thus been accomplished, I claim:

1. A device for measuring the angle of flexion of joints in the human body, comprising a transparent plate having a straight edge and a base line parallel thereto, a yoke in the form of an opening extending into said plate from said edge, the edge of said opening inward of said base line being in the shape of a semi-circle for receiving a body member, said plate marked with multiple calibrated scales to indicate degrees, said scales having a median line which if extended, passes through the center of said one-half circle of said yoke and marking the vertical zero and ninety degree mark respectively of said scales, and a base line marking the horizontal zero and ninety degree mark respectively of said scales, said yoke being disposed for receiving said body member.

2. A process for measuring the angle of flexion in the joints of a human body, by moving a member of the patient's body in relationship to a median line, and a base line marked on an apparatus comprising a transparent plate having a straight edge and base line parallel thereto, a yoke in the form of an opening extending into said plate from said edge, the edge of said opening inward of said base line being in the shape of a semi-circle for receiving a body member, said plate marked with multiple calibrated scales to indicate degrees, said scale having a median line which if extended, passes through the center of said one-half circle of said yoke and marking the vertical zero and ninety degree mark respectively of of said scales, and said base line marking the horizontal zero and ninety degree mark respectively of said scales, said yoke being disposed for receiving said body member.

References Cited
UNITED STATES PATENTS

| | | | |
|---|---|---|---|
| 1,318,607 | 10/1919 | Schreiber | 33—1 |
| 2,011,282 | 8/1935 | Hochman | 33—1 |
| 2,424,065 | 7/1947 | Stewart | 33—1 |
| 3,102,459 | 9/1963 | Zimberoff | 33—17 |

FOREIGN PATENTS

| | | |
|---|---|---|
| 337,807 | 6/1921 | Germany. |
| 917,696 | 2/1963 | Great Britain. |

SAMUEL S. MATTHEWS, Primary Examiner